United States Patent
Mihara (10) Patent No.: US 10,086,652 B2
(45) Date of Patent: Oct. 2, 2018

(54) TIRE TREAD RUBBER COMPOSITION

(71) Applicant: The Yokohama Rubber Co., LTD., Minato-ku, Tokyo (JP)

(72) Inventor: Satoshi Mihara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/741,209

(22) PCT Filed: Jul. 1, 2016

(86) PCT No.: PCT/JP2016/069680
§ 371 (c)(1),
(2) Date: Dec. 29, 2017

(87) PCT Pub. No.: WO2017/002966
PCT Pub. Date: Jan. 5, 2017

(65) Prior Publication Data
US 2018/0194167 A1    Jul. 12, 2018

(30) Foreign Application Priority Data
Jul. 2, 2015    (JP) .................................. 2015-133729

(51) Int. Cl.
*C08L 7/00* (2006.01)
*B60C 1/00* (2006.01)

(52) U.S. Cl.
CPC .............. *B60C 1/0016* (2013.01); *C08L 7/00* (2013.01); *C08L 2205/03* (2013.01)

(58) Field of Classification Search
CPC ....... B60C 1/0016; C08L 7/00; C08L 2205/03
See application file for complete search history.

(56) References Cited

U.S. PATENT DOCUMENTS

2006/0148979 A1    7/2006  Mori et al.

FOREIGN PATENT DOCUMENTS

| JP | H09-241427 | 9/1997 |
|---|---|---|
| JP | 2000-026656 | 1/2000 |
| JP | 2002-114869 | 4/2002 |
| JP | 2004-035725 | 2/2004 |
| JP | 2004-210931 | 7/2004 |
| JP | 4046678 | 2/2008 |
| JP | 2011-105848 | 6/2011 |
| JP | 2014-185339 | 10/2014 |
| JP | 2015-183104 | 10/2015 |
| WO | WO 2005/035646 | 4/2005 |

OTHER PUBLICATIONS

International Search Report for International Application No. PCT/JP2016/069680 dated Sep. 20, 2016, 4 pages, Japan.

*Primary Examiner* — Peter D Mulcahy
(74) *Attorney, Agent, or Firm* — Thorpe North & Western (57) ABSTRACT

Provided is a rubber composition for a tire tread, which includes 1 or greater parts by mass and less than 20 parts by mass of a millable silicone rubber compound per 100 parts by mass of a diene rubber, wherein the millable silicone rubber compound has a storage modulus of 0.3 to 10 kPa at a 450% shear strain at 110° C. and a glass transition temperature and a plasticity with a relationship: $14000<(273+Tg) \times Pn<82000$, where Tg is the glass transition temperature (° C.) and the Pn is the plasticity at 23° C.

8 Claims, 1 Drawing Sheet

TIRE TREAD RUBBER COMPOSITION

TECHNICAL FIELD

A rubber composition for a tire tread is provided. The composition results in improvement of friction performance on ice compared to a composition in the related art.

BACKGROUND ART

For a pneumatic tire for use on icy and snowy roads (studless tire), it is known that good performance on ice may be achieved by reducing a rubber hardness at a low temperature to ensure enough ground contact area with an icy and snowy road, and/or by forming an air bubble on a contact patch to eliminate a water film on an icy and snowy road. For example, air bubbles formed in large numbers in the tread rubber may absorb water from the water film on an ice surface when the tread is in contact with and pressed on the ice surface, but may release the absorbed water by a centrifugal force when the tread is separated from the ice surface. Repetition of such a process may improve on-ice performance.

Japanese Patent No. 4046678 proposes a rubber composition for a tire tread including a thermally expandable microcapsule to form such an air bubble. The thermally expandable microcapsule may be expanded by heat during vulcanization of a pneumatic tire. Thus, many air bubbles covered by the shells of the expanded microcapsules (hollow particles) may be formed in the tread rubber of the vulcanized tire.

However, the consumer demand for studless tire performance on ice is increasing in recent years and the demand for better friction performance on ice is further increasing.

SUMMARY

A rubber composition for a tire tread having an improved friction performance on ice compared to a composition in the related art is provided.

Provided is a rubber composition for a tire tread, which includes 1 or greater parts by mass and less than 20 parts by mass of a millable silicone rubber compound per 100 parts by mass of a diene rubber, wherein the millable silicone rubber compound has a storage modulus of from 0.3 to 10 kPa at a 450% shear strain at 110° C., and a glass transition temperature and a plasticity with a relationship:

$$14000 < (273+Tg) \times Pn < 82000$$

where Tg is the transition temperature Tg (° C.) and Pn is the plasticity at 23° C.

A rubber composition for a tire tread according to one embodiment includes a millable silicone rubber compound in a diene rubber, wherein the millable silicone rubber compound has a storage modulus of from 0.3 to 10 kPa at a 450% shear strain at 110° C., and a glass transition temperature and a plasticity with a relationship:

$$14000 < (273+Tg) \times Pn < 82000$$

where Tg is the glass transition temperature Tg (° C.) and Pn is the plasticity at 23° C. In such a rubber composition for a tire tread, the size of the millable silicone rubber compound dispersed in the diene rubber is appropriately controlled. Thus, the rubber composition for a tire tread can achieve friction performance on ice equal to or beyond the level in the related art.

The rubber composition for a tire tread may have a surface roughness (Ra) of 1 to 30 μm when measured by a contact-type surface roughness measurement. The rubber composition may further include from 0.2 to 20 parts by mass of thermally expandable microcapsules per 100 parts by mass of the diene rubber.

Additionally, the millable silicone rubber compound can include from 1 to 50 mass % of silica and/or carbon black. The millable silicone rubber compound may have a rubber hardness of from 10 to 50.

In one embodiment, the rubber composition for a tire tread may include a master batch that is a mixture of the millable silicone rubber compound and the thermally expandable microcapsule. In one embodiment, the rubber composition may include a peroxide-type crosslinking agent.

A pneumatic tire using a rubber composition for a tire tread according to an embodiment exhibits a superior performance as a studless tire and particularly an improved friction performance on ice.

DETAILED DESCRIPTION

Figure 1:
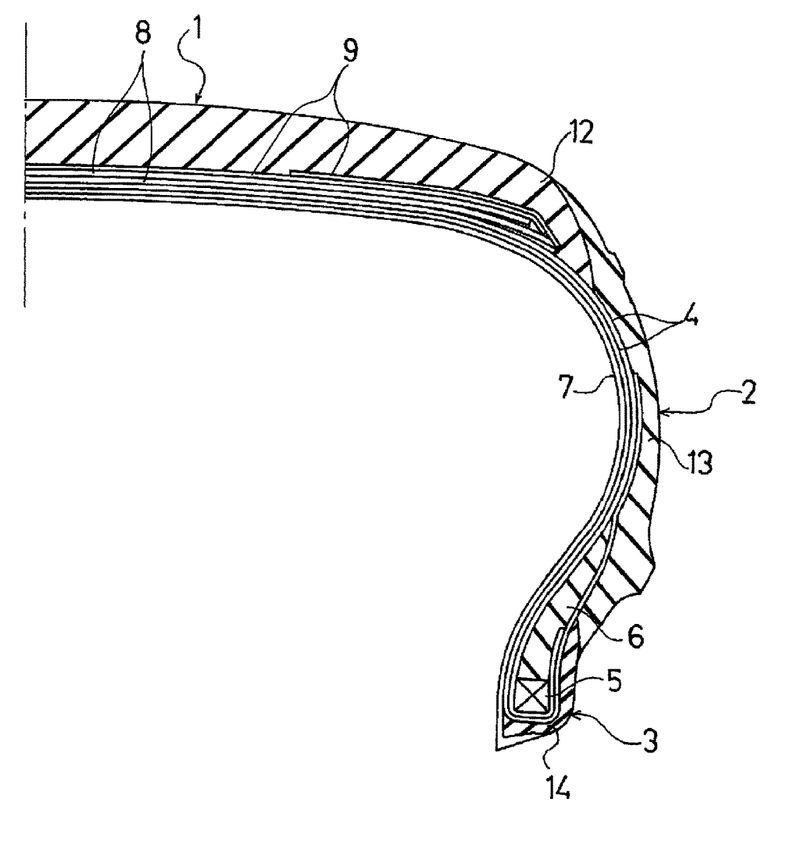
FIG. 1 is a partial cross-sectional view in a tire meridian direction illustrating a pneumatic tire according to an embodiment in which a rubber composition for a tire tread according to an embodiment is used.

FIG. 1 illustrates an example of an embodiment of a pneumatic tire, in which a rubber composition for a tire tread is used. The pneumatic tire includes a tread portion 1, sidewall portions 2, and bead portions 3.

In FIG. 1, two layers of a carcass layer 4, formed by arranging reinforcing cords extending in a tire circumferential direction at a predetermined pitch in the tire circumferential direction and embedding these reinforcing cords in a rubber layer, extend between left and right bead portions 3 in a pneumatic tire. Both ends of the carcass layer 4 are made to sandwich a bead filler 6 and are folded back around a bead core 5 that is embedded in the bead portions 3 in a tire axial direction from the inside to the outside. An innerliner layer 7 is disposed inward of the carcass layer 4. Two layers of a belt layer 8, formed by arranging reinforcing cords extending inclined to the tire circumferential direction in the tire axial direction at a predetermined pitch and embedding these reinforcing cords in a rubber layer, is disposed on an outer circumferential side of the carcass layer 4 of the tread portion 1. The reinforcing cords of the two layers of a belt layer 8 are inclined with respect to the tire circumferential direction, and the direction of the cords of the different layers have an opposite orientation and cross each other. A belt cover layer 9 is disposed outward of the belt layers 8. The tread portion 1 is formed from a tread rubber layer 12 on the outer circumferential side of the belt cover layer 9. The tread rubber layer 12 is preferably composed of the rubber composition for a tire tread according to an embodiment in the present disclosure. A side rubber layer 13 is disposed outward of the carcass layers 4 in each sidewall portion 2, and a rim cushion rubber layer 14 is provided outward of the portion of each carcass layer 4 that is folded back around the bead portion 3. It should be noted that a studless tire is not limited to an embodiment of the pneumatic tire illustrated in FIG. 1 as an example.

In one embodiment, the diene rubber used in the rubber composition for a tire tread may be a typical diene rubber that configures a studless tire, and the examples of such a diene rubber include natural rubber, isoprene rubber, butadiene rubber, various styrene-butadiene rubbers, butyl rubber, ethylene-propylene-diene rubber. Of these, natural rubber, butadiene rubber, and styrene-butadiene rubber are preferable, and natural rubber and/or butadiene rubber is more preferable. A pneumatic tire including natural rubber and/or butadiene rubber can exhibit superior friction performance on ice.

In one embodiment, the average glass transition temperature of the diene rubber is preferably −50° C. or lower and more preferably from −60 to −100° C. The diene rubber having the average glass transition temperature of −50° C. or lower can maintain pliability and/or flexibility of the rubber compound at a low temperature and increase adhesion force to ice surfaces. Such a diene rubber is suitably employed in a tread portion of a winter tire. The glass transition temperature (Tg) is defined as the midpoint of the transition region in a thermograph, measured by differential scanning calorimetry (DSC) at a rate of temperature increase of 20° C./minute. When the diene rubber is an oil extended product, the glass transition temperature is the glass transition temperature of the diene rubber containing no oil-extending component (the oil). Note that the average glass transition temperature can be determined by multiplying mass fractions of diene rubbers by corresponding glass transition temperatures of the diene rubbers and then summing up the obtained values (weighted average value of the glass transition temperatures). The total mass ratio of all of the diene rubbers is set to 1.

A millable silicone rubber compound is a silicone rubber compound which may be vulcanizable at a high temperature and can contain silica and/or carbon black. The millable silicone rubber is a silicone rubber, excluding a liquid silicone rubber, which has plasticity and may be blended with a crosslinking agent and cured thermally.

The millable silicone rubber compound used in an embodiment has a storage modulus of from 0.3 to 10 kPa at a temperature of 110° C. and at a shear strain of 450%. When the millable silicone rubber compound has the storage modulus of from 0.3 to 10 kPa under these conditions, the rubber composition for a tire tread may exhibit an improved performance on ice. Such a storage modulus of the millable silicone rubber compound at 110° C. and at a shear strain of 450% is considered to be related to dispersibility of the millable silicone rubber compound during kneading the rubber composition for a tire tread. When the millable silicone rubber compound is in a certain dispersion state in the diene rubber, the performance on ice can be greatly improved. The inventors discovered that the indicator of such a dispersion state is the storage modulus at a temperature of 110° C. and at a shear strain of 450%. The storage modulus at the temperature of 110° C. and at the shear strain of 450% is preferably from 1.0 to 9.0 kPa and more preferably from 1.5 to 8.0 kPa. When the storage modulus at the temperature of 110° C. and at the shear strain of 450% is less than 0.3 kPa or greater than 10 kPa, the performance on ice may not be improved and sometimes may deteriorate. The storage modulus at the temperature of 110° C. and at the shear strain of 450% can be adjusted by the amount of silica and/or carbon black included in the millable silicone rubber compound. The storage modulus of the millable silicone rubber compound herein may be determined by Rubber Process Analyzer 2000 (available from Alpha Technologies) using the following conditions; initial strain: 0%, strain amplitude: ±450%, frequency: 0.1 Hz, temperature: 110° C.

In one embodiment, the millable silicone rubber compound exhibits a relationship:

$$14000<(273+Tg)\times Pn<82000$$

where Tg is the glass transition temperature (° C.) and Pn is the plasticity of the millable silicone rubber compound at 23° C. When the value of $(273+Tg)\times Pn$ is greater than 14000 and less than 82000, the rubber composition for a tire tread exhibits the improved performance on ice. The value of $(273+Tg)\times Pn$ may be preferably from 15000 to 79000 and more preferably 16000 to 75000. When the product of the value of $(273+Tg)$ and the value of Pn (Pa·sec), which are the indicator for pliability and/or flexibility of the millable silicone rubber compound at low temperatures, and the indicator of dispersibity of the millable silicone rubber compound during the kneading, respectively, is within the range described above, the rubber composition can further improve the performance on ice. That is, when the value of $(273+Tg)\times Pn$ is not greater than 14000, the rubber composition for a tire tread may not exhibit improvement on performance on ice. When the value of $(273+Tg)\times Pn$ is not less than 82000, the rubber composition for a tire tread may exhibit poor performance on ice. The glass transition temperature Tg (° C.) of the millable silicone rubber compound can be determined by the same method as described above for the diene rubber. The plasticity Pn (Pa·sec) of the millable silicone rubber compound can be determined by the testing method described in ISO 7323 using a parallel plate plastometer (Williams Plastometer) described in JIS (Japanese Industrial Standard) K6249.

The weight average molecular weight of the millable silicone rubber compound is not particularly limited, but preferably from 400000 to 900000 and more preferably from 450000 to 850000. The weight average molecular weight of the millable silicone rubber compound herein was determined by GPC (gel permeation chromatography) using the polystyrene standard.

The rubber hardness of the millable silicone rubber compound is preferably from 10 to 50, and more preferably from 15 to 45. When the rubber hardness of the millable silicone rubber compound is less than 10, the rubber is too soft and the wear resistance may deteriorate. When the rubber hardness of the millable silicone rubber compound is greater than 50, the rubber may be too hard and exhibit less improvement on the on-ice performance. The rubber hardness of the millable silicone rubber compound herein refers to the rubber hardness of the thermally cured material mixed with a peroxide vulcanizing agent, and may be determined by a Type-A durometer at 23° C. in accordance with JIS K6253.

The rubber hardness of the millable silicone rubber compound is preferably less than that of the base rubber of the rubber composition. The base rubber herein refers to the rubber composition, which is the rubber composition for a tire tread according to an embodiment minus the millable silicone rubber compound and the thermally expandable microcapsule. The rubber hardness of the millable silicone rubber compound is preferably less than that of the base rubber. Preferably, the rubber hardness of the millable silicone rubber compound is less than that of the base rubber by 5 to 40. Thus, the followability of the tire can be improved and water repellency is superior.

The millable silicone rubber compound is a blend, in which the silicone raw rubber is blended with other reinforcing fillers such as silica and carbon black, and compounding agents such as dispersant and stabilizer. Thereby appropriate rubber strength and rubber hardness can be imparted to the millable silicone rubber compound. The millable silicone rubber compound preferably includes from 1 to 50 mass %, more preferably from 4 to 45 mass % of silica and/or carbon black. Silica and carbon black included in the millable silicone rubber compound in this range may result in storage modulus, plasticity, rubber hardness, and the like, in the suitable ranges.

The compounded content of the millable silicone rubber compound is not less than 1 part by mass and less than 20 parts by mass, preferably from 2 to 19 parts by mass, and more preferably 3 to 18 parts by mass, per 100 parts by mass of the diene rubber. When the compounded content of the millable silicone rubber compound is less than 1 part by mass, on-ice performance may be insufficiently imparted to the rubber composition for a tire tread. When the compounded content of the millable silicone rubber compound is not less than 20 parts by mass, the rubber strength of the rubber composition decreases and the on-ice performance may not be improved.

The rubber composition for a tire tread, in which the millable silicone rubber compound is blended, may preferably have a surface roughness (Ra) of 1 to 30 μm and more preferably 2 to 25 μm, when measured by a contact-type surface roughness measurement. The surface roughness (Ra) within this range can improve the on-ice performance of the rubber composition for a tire tread. When the millable silicone rubber compound is dispersed in an excessively fine state in the diene rubber, the resultant surface roughness (Ra) is less than 1 μm and the surface of the tread rubber is smooth. In this case, water can easily be present between the tire contact surface and the tread rubber, resulting in a smaller actual ground contact area of the tread rubber. Thus, the superior on-ice performance may not be obtained. Alternatively, when the size of the dispersed millable silicone rubber compound in the diene rubber is excessively large, the surface roughness (Ra) may become greater than 30 μm, resulting in the larger unevenness of the tread rubber. In this case, the actual contact area between the tread rubber surface and the tire contact surface is small. Thus, the superior on-ice performance may not be obtained. The surface roughness (Ra) of the rubber composition for a tire tread can be adjusted to the range above when the storage modulus of the millable silicone rubber compound at a temperature of 110° C. and at a shear strain of 450% is from 0.3 to 10 kPa. Also, such a suitable surface roughness (Ra) can be achieved even more easily, when the value of $(273+Tg) \times Pn$ is greater than 14000 and less than 82000. The surface roughness (Ra) of the rubber composition for a tire tread can be determined as follows: using a Confocal Laser Microscope available from Keyance Corp., the center line average roughness is measured for randomly selected 5 locations on the sample surface. The average of the 5 measured values is determined as an arithmetic mean roughness and defined as the surface roughness (Ra) of the surface.

In one embodiment, the rubber composition for a tire tread may include a thermally expandable microcapsule to further improve on-ice performance. The thermally expandable microcapsule is preferably blended in 0.2 to 20 parts by mass, and more preferably in 1.0 to 18 parts by mass per 100 parts by mass of the diene rubber. When the compounded content of the thermally expandable microcapsules is less than 0.2 parts by mass, the volume of hollow particles (microcapsule shells) in which the thermally expandable microcapsules expand at the time of vulcanization is insufficient, which may make it impossible to sufficiently improve the friction performance on ice. When the compounded content of the thermally expandable microcapsules exceeds 20 parts by mass, the wear resistance of the tread rubber may be diminished.

The thermally expandable microcapsules have a structure in which a thermally expandable substance is encapsulated in a shell material formed from a thermoplastic resin. Therefore, when the microcapsules dispersed in the rubber composition are heated at the time of the vulcanization molding of an unvulcanized tire, the thermally expandable substance encapsulated in the shell material expands so as to increase the particle size of the shell material and to form multiple hollow particles in the tread rubber. As a result, a water film generated on the surface of ice is effectively absorbed and removed, and a micro-edge effect is achieved, and as a result, the performance on ice is improved. The shell material of the microcapsules is harder than the tread rubber and can therefore enhance the wear resistance of the tread portion. The shell material of the thermally expandable microcapsules can be formed from a nitrile-based polymer.

The thermally expandable substance encapsulated in the shell material of the microcapsules has the property of vaporizing or expanding due to heat, and an example thereof is at least one type selected from the group consisting of hydrocarbons such as isoalkanes and normal alkanes. Examples of the isoalkanes include isobutane, isopentane, 2-methylpentane, 2-methylhexane, and 2,2,4-trimethylpentane, and examples of normal alkanes include n-butane, n-propane, n-hexane, n-heptane, and n-octane. These hydrocarbons may each be used alone, or a plurality thereof may be used in combination. As a preferred form of a thermally expandable substance, a substance in which a hydrocarbon which is a gas at room temperature is dissolved in a hydrocarbon which is a liquid at room temperature may be used. By using a mixture of such hydrocarbons, it is possible to achieve sufficient expansion power from a low temperature region to a high temperature region within the vulcanization molding temperature range (150 to 190° C.) of an unvulcanized tire.

In one embodiment, the millable silicone rubber compound may be blended together with the thermally expandable microcapsule described above in the rubber composition for a tire tread. Thus, the ground contact shape at the contact patch may be appropriately formed and friction performance on ice may be enhanced.

The rubber composition for a tire tread may be preferably compounded with a peroxide vulcanizing agent. Blending the peroxide vulcanizing agent can improve wear resistance while enhancing the friction performance on ice. The compounded content of the peroxide vulcanizing agent is preferably from 0.5 to 5.0 mass % and more preferably from 1.0 to 4.5 mass % based on the mass of the millable silicone rubber compound. When the compounded content of the peroxide vulcanizing agent is less than 0.5 mass %, the action of the peroxide vulcanizing agent may not be sufficiently obtained. On the other hand, when the compounded content of the peroxide vulcanizing agent is greater than 5.0 mass %, the rubber composition for a tire tread may become brittle and wear resistance may be deteriorated.

A method of manufacturing the rubber composition for a tire tread above includes: preparing a kneaded material by mixing and kneading the diene rubber with the compounding agents excluding the thermally expandable microcapsule and the vulcanization additive, and mixing the thermally expandable microcapsule and the vulcanization additive after cooling the kneaded material to a lower temperature to prepare the rubber composition for a tire tread. Examples of the vulcanization additive include a vulcanizing agent, a crosslinking agent and a vulcanization accelerator.

The efficient method of manufacturing the rubber composition for a tire tread according to an embodiment preferably includes preparing a master batch by mixing the millable silicone rubber compound and the thermally expandable microcapsule in advance and mixing the master batch with the diene rubber. The vulcanization additive may be mixed at the same time, or after mixing the master batch with the diene rubber.

In addition, the peroxide vulcanizing agent can be added to the master batch. Addition of the peroxide vulcanizing agent to the master batch can enhance the strength of the silicone rubber and improve the friction performance on ice. The compounded content of the peroxide vulcanizing agent may be in the range described above.

The mixing conditions for the millable silicone rubber compound and the thermally expandable microcapsule are not particularly limited and may be any condition as long as the breakage of the thermally expandable microcapsule is suppressed and thermal expansion does not occur. The temperature and the rotational speed can be selected to produce a substantially uniform mixture of the millable silicone rubber compound and the thermally expandable microcapsule.

A kneading apparatus for mixing the millable silicone rubber compound and the thermally expandable microcapsule is not particularly limited and examples include a Banbury mixer, a kneader and a roll mill.

The rubber composition for a tire tread may also include fillers such as silica and carbon black. By compounding the filler, the wear resistance can be enhanced by increasing the rubber strength. The compounded content of the filler is preferably from 10 to 100 parts by mass, and more preferably from 20 to 90 parts by mass, per 100 parts by mass of the diene rubber. When the compounded content of the filler is less than 10 parts by mass, the rubber strength is great enough to enhance the wear resistance performance. When the compounded content of the filler is greater than 100 parts by mass, the rolling resistance of the rubber composition for a tire tread may deteriorate.

In one embodiment, the rubber composition for a tire tread may include a silane coupling agent when the rubber composition includes silica. By compounding a silane coupling agent, it is possible to improve the dispersibility of the silica in the diene rubber and to increase the reinforcing property with the rubber.

The compounded content of the silane coupling agent is preferably from 3 to 15 mass %, and more preferably from 5 to 10 mass %, relative to the compounded content of the silica in the rubber composition for a tire tread. When the compounded content of the silane coupling agent is less than 3 mass %, it is not possible to sufficiently improve the dispersion of the silica. When the compounded content of the silane coupling agent exceeds 15 mass %, the silane coupling agents will condense, and the desired effects cannot be obtained.

The type of the silane coupling agent is not particularly limited as long as it is a silane coupling agent that can be used in rubber compositions containing silica. Examples thereof include sulfur-containing silane coupling agents, such as bis(3-triethoxysilylpropyl)tetrasulfide, bis(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

The filler besides silica and carbon black may be any filler used in a pneumatic tire and examples include calcium carbonate, magnesium carbonate, talc, clay, alumina, aluminum hydroxide, titanium oxide, and calcium sulfate.

In addition to the fillers described above, the rubber composition for a tire tread may also contain various additives that are commonly used in a rubber composition for a tire. Examples thereof include vulcanization or crosslinking agents, vulcanization accelerators, anti-aging agents, plasticizers, and processing aids. These additives may be kneaded in by any commonly known method to form a unvulcanized rubber composition, which can be used for vulcanizing or crosslinking. The compounded content of these additives may be any amount in the related art, as long as the object of the present technology is not impaired. Such a rubber composition can be produced by mixing the components described above using a publicly known rubber kneading machine, such as a Banbury mixer, a kneader, and a roll.

The rubber composition for a tire tread according to an embodiment is preferable for use in tread portions of a studless tire. The tread portion configured as described can exhibit the improved on-ice performance equal to or beyond the level in the related art.

The embodiments are further described below by examples. However, the scope of the present technology is not limited to these examples.

EXAMPLES

Reference Examples 1 and 2, Examples 1 to 14, and Comparative Examples 1 to 10

A total of 26 types of the rubber composition (Reference Examples 1 and 2, Examples 1 to 14, and Comparative Examples 1 to 10) containing a common blend of the diene rubber, the filler, and the compounding agent listed in Table 4, and further containing types and compounded contents of the millable silicone rubber compounds, the thermally expandable microcapsules, and the peroxide-type crosslinking agents listed in Table 1 and 2 were prepared. The components excluding sulfur, the vulcanization accelerator, the thermally expandable microcapsule, the millable silicone rubber compound, and the peroxide-type crosslinking agent were kneaded in a 1.8 L sealed mixer for five minutes, then discharged and cooled. Then, sulfur, the vulcanization accelerator, the thermally expandable microcapsule, the millable silicone rubber compound, and the peroxide-type crosslinking agent were added to the kneaded material, and mixed in an open roll to prepare an unvulcanized rubber composition. Note that the compounded content of the millable silicone rubber compound listed in Tables 1 and 2 are indicated in parts by mass per 100 parts by mass of the diene rubber listed in Table 4.

Examples 15 to 20 and Comparative Examples 11 to 13

The total of 9 types of the master batch (MB-1 to MB-9) listed in Table 3 was prepared. All the components were weighed to the compounding ratio of the corresponding items in each master batch and mixed at a temperature of 100° C. for 2.5 minutes using a 1.8 L seal-type Banbury mixer. Thus, the total of 9 types of the master batch (MB-1 to MB-9) were prepared.

A total of 9 types of the rubber compositions including a common blend of the diene rubber, the filler and the compounding agent listed in Table 4 and further containing types and compounded contents of the master batches (Examples 15 to 20, Comparative Examples 11 to 13) in Table 3 were prepared. The components excluding the master batch, the sulfur and the vulcanization accelerator were kneaded for five minutes in a 1.8 L sealed mixer. The mixture was discharged and cooled. Then, the master batch, the sulfur and the vulcanization accelerator were added to the mixture and kneaded in an open roll to obtain the unvulcanized rubber composition. Note that the compounded contents of the compounding agents listed in Table 3 are expressed as values in part by mass per 100 parts by mass of the diene rubbers listed in Tables 4.

The obtained 35 types of rubber compositions were press-vulcanized at 170° C. for 10 minutes in a predetermined mold to produce vulcanized rubber test pieces formed from the rubber compositions for a tire tread. Friction performance on ice and surface roughness (Ra) of the obtained vulcanized rubber test pieces were evaluated according to the methods described below.

Friction Performance on Ice

The obtained vulcanized rubber test piece was bonded to a substrate rubber in the form of a flat column and the coefficient of friction on ice was determined by an inside drum-type friction on ice tester under conditions of a measurement temperature of −1.5° C., a load of 5.5 kg/cm$^2$, and a drum rotation speed of 25 km/h. The obtained coefficients of friction on ice were converted to index values, relative to the value of Reference Example 1 as 100 in Table 1, and relative to the value of Reference Example 2 as 100 in Table 2 and 3. These values were reported in the rows labeled "Frictional force on ice" in Table 1 to 3. Larger index values indicate greater frictional force on ice and better friction performance on ice.

Surface Roughness (Ra)

The surface roughness (Ra) of the obtained vulcanized rubber test piece was determined as follows: using a Confocal Laser Microscope available from Keyance Corp., the center line average roughness was measured for randomly selected 5 locations on the sample surface. The average of the 5 measured values was determined as an arithmetic mean roughness and defined as the surface roughness (Ra) of the surface. The obtained values were converted to index values, relative to the value of Reference Example 1 as 100 in Table 1, and relative to the value of Reference Example 2 as 100 in Table 2 and 3. These values were reported in the rows labeled "Surface roughness (Ra)" in Table 1 to 3.

TABLE 1-1

| | | | Reference Example 1 | Comparative Example 1 | Example 1 | Example 2 | Comparative Example 2 | Example 3 |
|---|---|---|---|---|---|---|---|---|
| Silicone rubber compound | Compounded content relative to the diene rubber | Parts by mass | — | 0.5 | 5 | 16 | 25 | 5 |
| | Type (grade name) | | — | SR-1 | SR-1 | SR-1 | SR-1 | SR-2 |
| | E'(110° C.) | kPa | — | 2.0 | 2.0 | 2.0 | 2.0 | 6.4 |
| | Tg | ° C. | — | −124 | −124 | −124 | −124 | −120 |
| | Pn(23° C.) | Pa · s | — | 162 | 162 | 162 | 162 | 233 |
| | (273 + Tg) × Pn | Pa · s · K | — | 24138 | 24138 | 24138 | 24138 | 35649 |
| Friction force on ice | | Index value | 100 | 101 | 112 | 122 | 102 | 110 |
| Surface roughness (Ra) | | μm | 0.1 | 0.6 | 7.2 | 18.9 | 35 | 8.8 |

TABLE 1-2

| | | | Example 4 | Example 5 | Example 6 | Comparative Example 3 | Comparative Example 4 | Comparative Example 5 |
|---|---|---|---|---|---|---|---|---|
| Silicone rubber compound | Compounded content relative to the diene rubber | Parts by mass | 16 | 5 | 16 | 16 | 16 | 16 |
| | Type (grade name) | | SR-2 | SR-3 | SR-3 | SR-4 | SR-5 | SR-6 |
| | E'(110° C.) | kPa | 6.4 | 4.8 | 4.8 | 12.3 | 1.1 | 7.9 |
| | Tg | ° C. | −120 | −125 | −125 | −120 | −123 | −68 |
| | Pn(23° C.) | Pa · s | 233 | 484 | 484 | 470 | 90 | 404 |
| | (273 + Tg) × Pn | Pa · s · K | 35649 | 71632 | 71632 | 71910 | 13500 | 82820 |
| Friction force on ice | | Index value | 115 | 108 | 112 | 98 | 98 | 94 |
| Surface roughness (Ra) | | μm | 13.2 | 9.1 | 10.4 | 13.2 | 0.8 | 9.2 |

TABLE 2-1

| | | Reference Example 2 | Comparative Example 6 | Example 7 | Example 8 | Comparative Example 7 |
|---|---|---|---|---|---|---|
| Compounded content of microcapsules | Parts by mass | 5 | 5 | 5 | 5 | 5 |
| Compounded content of peroxide-type crosslinking agent | Parts by mass | — | — | — | — | — |

TABLE 2-1-continued

|  |  |  | Reference Example 2 | Comparative Example 6 | Example 7 | Example 8 | Comparative Example 7 |
|---|---|---|---|---|---|---|---|
| Silicone rubber compound | Compounded content relative to the diene rubber | Parts by mass | — | 0.5 | 5 | 16 | 25 |
|  | Type (grade name) |  | — | SR-1 | SR-1 | SR-1 | SR-1 |
|  | E'(110° C.) | kPa | — | 2.0 | 2.0 | 2.0 | 2.0 |
|  | Tg | ° C. | — | −124 | −124 | −124 | −124 |
|  | Pn(23° C.) | Pa · s | — | 162 | 162 | 162 | 162 |
|  | (273 + Tg) × Pn | Pa · s · K | — | 24138 | 24138 | 24138 | 24138 |
| Friction force on ice |  | Index value | 100 | 102 | 128 | 129 | 101 |
| Surface roughness (Ra) |  | μm | 5 | 5.9 | 8.4 | 23.3 | 41.2 |

TABLE 2-2

|  |  | Example 9 | Example 10 | Example 11 | Comparative Example 8 | Comparative Example 9 |
|---|---|---|---|---|---|---|
| Compounded content of microcapsules | Parts by mass | 5 | 5 | 5 | 5 | 5 |
| Compounded content of peroxide-type crosslinking agent | Parts by mass | — | — | — | — | — |
| Silicone rubber compound | Compounded content relative to the diene rubber | Parts by mass | 5 | 16 | 16 | 16 |  |
|  | Type (grade name) | SR-2 | SR-2 | SR-3 | SR-4 | SR-5 |
|  | E'(110° C.) kPa | 6.4 | 4.8 | 12.3 | 1.1 |  |
|  | Tg ° C. | −120 | −125 | −120 | −123 |  |
|  | Pn(23° C.) Pa · s | 233 | 484 | 470 | 90 |  |
|  | (273 + Tg) × Pn Pa · s · K | 35649 | 71632 | 71910 | 13500 |  |
| Friction force on ice | Index value | 115 | 119 | 122 | 96 | 95 |
| Surface roughness (Ra) | μm | 12.3 | 16.6 | 14.3 | 16.1 | 4.2 |

TABLE 2-3

|  |  | Comparative Example 10 | Example 12 | Example 13 | Example 14 |
|---|---|---|---|---|---|
| Compounded content of microcapsules | Parts by mass | 5 | 5 | 5 | 5 |
| Compounded content of peroxide-type crosslinking agent | Parts by mass | — | 0.5 | 0.5 | 0.5 |
| Silicone rubber compound | Compounded content relative to the diene rubber | Parts by mass | 16 | 16 | 16 | 16 |
| Type (grade name) |  | SR-6 | SR-1 | SR-2 | SR-3 |
| E'(110° C.) | kPa | 7.9 | 2.0 | 6.4 | 4.8 |
| Tg | ° C. | −68 | −124 | −120 | −125 |
| Pn(23° C.) | Pa · s | 404 | 162 | 233 | 484 |
| (273 + Tg) × Pn | Pa · s · K | 82820 | 24138 | 35649 | 71632 |
| Friction force on ice | Index value | 96 | 121 | 114 | 118 |
| Surface roughness (Ra) | μm | 14.1 | 4.3 | 11.2 | 12.7 |

TABLE 3-1

|  |  |  | Example 15 | Comparative Example 11 | Example 16 | Example 17 | Example 18 |
|---|---|---|---|---|---|---|---|
| Master batch | Type (Master batch name) |  | MB-1 | MB-2 | MB-3 | MB-4 | MB-5 |
|  | Compounded content relative to the diene rubber | Parts by mass | 21 | 30 | 21 | 21 | 22 |

TABLE 3-1-continued

|  |  |  | Example 15 | Comparative Example 11 | Example 16 | Example 17 | Example 18 |
|---|---|---|---|---|---|---|---|
| Details of compounded contents in Master batch above |  |  |  |  |  |  |  |
| Microcapsules |  | (parts by mass) | (5) | (5) | (5) | (5) | (5) |
| Peroxide-type crosslinking agent |  | (parts by mass) |  |  |  |  | (0.5) |
| Silicone rubber compound | Compounded content relative to the diene rubber | (parts by mass) | (16) | (25) | (16) | (16) | (16) |
|  | Type (grade name) |  | SR-1 | SR-1 | SR-2 | SR-3 | SR-1 |
|  | E'(110° C.) | kPa | 2.0 | 2.0 | 6.4 | 4.8 | 2.0 |
|  | Tg | ° C. | −124 | −124 | −120 | −125 | −124 |
|  | Pn(23° C.) | Pa·s | 162 | 162 | 233 | 484 | 162 |
|  | (273 + Tg) × Pn | Pa·s·K | 24138 | 24138 | 35649 | 71632 | 24138 |
| Friction force on ice |  | Index value | 131 | 86 | 120 | 105 | 101 |
| Surface roughness (Ra) |  | μm | 29 | 38 | 23.1 | 13 | 23 |

TABLE 3-2

|  |  |  | Comparative Example 12 | Example 19 | Comparative Example 13 | Example 20 |
|---|---|---|---|---|---|---|
| Master batch | Type (Master batch name) |  | MB-6 | MB-7 | MB-8 | MB-9 |
|  | Compounded content relative to the diene rubber | Parts by mass | 31 | 22 | 31 | 22 |
| Details of compounded contents in Master batch above |  |  |  |  |  |  |
| Microcapsules |  | (parts by mass) | (5) | (5) | (5) | (5) |
| Peroxide-type crosslinking agent |  | (parts by mass) | (0.5) | (0.5) | (0.5) | (0.5) |
| Silicone rubber compound | Compounded content relative to the diene rubber | (parts by mass) | (25) | (16) | (25) | (16) |
|  | Type (grade name) |  | SR-1 | SR-2 | SR-2 | SR-3 |
|  | E'(110° C.) | kPa | 2.0 | 6.4 | 6.4 | 4.8 |
|  | Tg | ° C. | −124 | −120 | −120 | −125 |
|  | Pn(23° C.) | Pa·s | 162 | 233 | 233 | 484 |
|  | (273 + Tg) × Pn | Pa·s·K | 24138 | 35649 | 35649 | 71632 |
| Friction force on ice |  | Index value | 79 | 118 | 83 | 124 |
| Surface roughness (Ra) |  | μm | 38 | 36 | 12 | 21 |

The types of raw materials used in Tables 1 to 3 are described below.

SR-1: Millable silicone rubber compound containing 19 mass % of silica, KE-931-U, available from Shin-Etsu Chemical Co., Ltd., the storage modulus at the temperature of 110° C. and at the shear strain of 450% is 2.0 kPa, the glass transition temperature (Tg) is −124° C., and the plasticity (Pn) is 162 Pa's.

SR-2: Millable silicone rubber compound containing 30 mass % of silica, KE-951-U, available from Shin-Etsu Chemical Co., Ltd., the storage modulus at the temperature of 110° C. and at the shear strain of 450% is 6.4 kPa, the glass transition temperature (Tg) is −120° C., and the plasticity (Pn) is 233 Pa's.

SR-3: Millable silicone rubber compound containing 31 mass % of carbon black, KE-3601-SBU, available from Shin-Etsu Chemical Co., Ltd., the storage modulus at the temperature of 110° C. and at the shear strain of 450% is 4.8 kPa, the glass transition temperature (Tg) is −125° C., and the plasticity (Pn) is 484 Pa·s.

SR-4: Millable silicone rubber compound containing 48 mass % of silica, KE-981-U, available from Shin-Etsu Chemical Co., Ltd., the storage modulus at the temperature of 110° C. and at the shear strain of 450% is 12.3 kPa, the glass transition temperature (Tg) is −120° C., and the plasticity (Pn) is 470 Pa·s.

SR-5: Raw silicone rubber containing no silica, a raw rubber of KE-931, available from Shin-Etsu Chemical Co., Ltd., the storage modulus at the temperature of 110° C. and at the shear strain of 450% is 1.0 kPa, the glass transition temperature is −123° C., and the plasticity (Pn) is 90 Pa·s.

SR-6: Millable silicone rubber compound containing 27 mass % of silica, FE-351-U, available from Shin-Etsu Chemical Co., Ltd., the storage modulus at the temperature of 110° C. and at the shear strain of 450% is 7.9 kPa, the glass transition temperature (Tg) is −68° C., and the plasticity (Pn) is 404 Pa·s.

Microcapsules: Thermally expandable microcapsules, Microsphere F100 available from Matsumoto Yushi-Seiyaku Co., Ltd.

Peroxide vulcanizing agent: C-8 available from Shin-Etsu Chemical Co., Ltd., containing about 25% of 2,5-dimethyl-2,5-di(t-butylperoxy)hexane.

MB-1 to MB-9: Master batches prepared as above.

TABLE 4

| Common blend of the rubber compositions | |
|---|---|
| NR | 60 Parts by mass |
| BR | 40 Parts by mass |
| Carbon black | 50 Parts by mass |
| Silica | 15 Parts by mass |
| Silane coupling agent | 1.5 Parts by mass |
| Oil | 30 Parts by mass |
| Zinc oxide | 3 Parts by mass |
| Stearic acid | 1 Parts by mass |
| Anti-aging agent 1 | 1.5 Parts by mass |
| Anti-aging agent 2 | 1 5 Parts by mass |
| Sulfur | 1.5 Parts by mass |
| Vulcanization accelerator | 1.5 Parts by mass |

The types of raw materials used in Table 4 are described below.

NR: Natural rubber; RSS #3
BR: Butadiene rubber; Nipol BR1220, available from Zeon Corporation
Carbon black: SEAST 6, available from Tokai Carbon Co., Ltd.
Silica: Ultrasil VN3, available from Evonik Industries AG
Silane coupling agent: Sulfur-containing silane coupling agent, Si69, available from Degussa
Oil: Extract No. 4S, available from Showa Shell Sekiyu K.K.
Zinc oxide: Zinc Oxide III, available from Seido Chemical Industry Co., Ltd.
Stearic acid: beads stearic acid, available from NOF Corporation
Anti-aging agent 1: 6PPD, available from Flexsys
Anti-aging agent 2: Nocrac 224, available from Ouchi Shinko Chemical Industrial Co., Ltd.
Sulfur: "Golden Flower" oil-treated sulfur powder, available from Tsurumi Chemical Industry, Co., Ltd.
Vulcanization accelerator: NOCCELER CZ-G, available from Ouchi Shinko Chemical Industrial Co., Ltd.

As is clear from Tables 1 to 3, it was confirmed that the rubber compositions for tires according to Examples 1 to 20 improve the friction performance on ice beyond the level in the related art.

Because the rubber composition of Comparative Example 1 contained less than 1 part by mass of the millable silicone rubber compound (SR-1), the rubber composition did not exhibit sufficient improvement on friction performance on ice.

Because the rubber composition of Comparative Example 2 contained not less than 20 parts by mass of the millable silicone rubber compound (SR-1), the rubber composition did not exhibit sufficient improvement on friction performance on ice.

Because the rubber composition of Comparative Example 3 contained the millable silicone rubber compound (SR-4) having the storage modulus greater than 10 kPa at the temperature of 110° C. and at the shear strain of 450%, the rubber composition actually exhibited poor friction performance on ice.

Because the rubber composition of Comparative Example 4 contained the millable silicone rubber compound (SR-5) having the storage modulus not less than 0.3 kPa at the temperature of 110° C. and at the shear strain of 450%, and the value of (273+Tg)×Pn not greater than 14000, the rubber composition actually exhibited poor friction performance on ice.

Because the rubber composition of Comparative Example 5 contained the millable silicone rubber compound (SR-6) having the storage modulus not greater than 10 kPa at the temperature of 110° C. and at the shear strain of 450%, and the value of (273+Tg)×Pn not less than 82000, the rubber composition actually exhibited poor friction performance on ice.

As evident from Table 2, because the rubber composition of Comparative Example 6 contained less than 1 part by mass of the millable silicone rubber compound (SR-1), the rubber composition did not exhibit sufficient improvement on friction performance on ice.

Because the rubber composition of Comparative Example 7 contained not less than 20 parts by mass of the millable silicone rubber compound (SR-1), the rubber composition did not exhibit sufficient improvement on friction performance on ice.

Because the rubber composition of Comparative Example 8 contained the millable silicone rubber compound (SR-4) having the storage modulus greater than 10 kPa at the temperature of 110° C. and at the shear strain of 450%, the rubber composition actually exhibited poor friction performance on ice.

Because the rubber composition of Comparative Example 9 contained the millable silicone rubber compound (SR-5) having the storage modulus not less than 0.3 kPa at the temperature of 110° C. and at the shear strain of 450%, and the value of (273+Tg)×Pn not greater than 14000, the rubber composition actually exhibited poor friction performance on ice.

Because the rubber composition of Comparative Example 10 contained the millable silicone rubber compound (SR-6) having the storage modulus not greater than 10 kPa at the temperature of 110° C. and at the shear strain of 450%, and the value of (273+Tg)×Pn not less than 82000, the rubber composition actually exhibited poor friction performance on ice.

Because the rubber composition of Comparative Example 11 contained not less than 20 parts by mass of the millable silicone rubber compound (SR-1), the rubber composition actually exhibited poor friction performance on ice.

Because the rubber composition of Comparative Example 12 contained not less than 20 parts by mass of the millable silicone rubber compound (SR-1), the rubber composition actually exhibited poor friction performance on ice.

Because the rubber composition of Comparative Example 13 contained not less than 20 parts by mass of the millable silicone rubber compound (SR-2), the rubber composition actually exhibited poor friction performance on ice.

The invention claimed is:

1. A rubber composition for a tire tread comprising:
   1 or greater parts by mass and less than 20 parts by mass of a millable silicone rubber compound per 100 parts by mass of a diene rubber,
   wherein the millable silicone rubber compound comprises from 1 to 50 mass % of silica and/or carbon black, and the millable silicone rubber compound has a storage modulus of 0.3 to 10 kPa at a 450% shear strain at 110° C. and has a glass transition temperature and a plasticity with a relationship:

$$14000 < (273+Tg) \times Pn < 82000$$

where Tg is the glass transition temperature (° C.) and Pn is the plasticity at 23° C.

2. The rubber composition according to claim 1, wherein the rubber composition, after vulcanization, has a surface roughness (Ra) measured by a contact-type surface roughness measurement instrument of from 1 to 30 μm.

3. The rubber composition according to claim 1, further comprising from 0.2 to 20 parts by mass of a thermally expandable microcapsule per 100 parts by mass of the diene rubber.

4. The rubber composition according to claim 3, wherein the rubber composition comprises a master batch comprising a mixture of the millable silicone rubber compound and the thermally expandable microcapsule.

5. The rubber composition according to claim 1, further comprising a peroxide-type crosslinking agent.

6. The rubber composition according to claim 2, further comprising from 0.2 to 20 parts by mass of a thermally expandable microcapsule per 100 parts by mass of the diene rubber.

7. The rubber composition according to claim 6, wherein the rubber composition comprises a master batch comprising a mixture of the millable silicone rubber compound and the thermally expandable microcapsule.

8. The rubber composition according to claim 7, further comprising a peroxide-type crosslinking agent.

* * * * *